US012651935B2

(12) United States Patent
Tsuchiya et al.

(10) Patent No.: US 12,651,935 B2
(45) Date of Patent: Jun. 9, 2026

(54) MOTOR

(71) Applicant: TOYOTA JIDOSHA KABUSHIKI KAISHA, Toyota (JP)

(72) Inventors: Yukio Tsuchiya, Toyota (JP); Yasuhiro Makido, Toyota (JP); Yuichiro Kanada, Toyota (JP); Shogo Kajimoto, Toyota (JP); Hideyuki Higashi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 248 days.

(21) Appl. No.: 18/501,162

(22) Filed: Nov. 3, 2023

(65) Prior Publication Data

US 2024/0162765 A1      May 16, 2024

(30) Foreign Application Priority Data

Nov. 10, 2022     (JP) ................................. 2022-180238

(51) Int. Cl.
*H02K 1/20*          (2006.01)
*H02K 9/19*          (2006.01)
*H02K 21/24*        (2006.01)

(52) U.S. Cl.
CPC ................. *H02K 1/20* (2013.01); *H02K 9/19* (2013.01); *H02K 21/24* (2013.01)

(58) Field of Classification Search
CPC .. H02K 1/20; H02K 3/24; H02K 5/20; H02K 5/203
See application file for complete search history.

(56) References Cited

U.S. PATENT DOCUMENTS 8,525,375 B2 *   9/2013   Pal ........................... H02K 5/18
                                                                                      310/58
11,125,315 B2   9/2021   Graves et al.
2010/0052441 A1   3/2010   Fukushima
(Continued)

FOREIGN PATENT DOCUMENTS

CN        111969791 A   * 11/2020   ............... H02K 1/20
CN        112615445 A   *  4/2021   ............... H02K 3/24
(Continued)

OTHER PUBLICATIONS

Ying_-_Design_and_optimisation_of_oil_injection_pipe.pdf (Year: 2025).*
(Continued)

*Primary Examiner* — Maged M Almawri
*Assistant Examiner* — Ahmed F Seck
(74) *Attorney, Agent, or Firm* — Sughrue Mion, PLLC

(57) ABSTRACT

A motor may include a rotor; a stator comprising a stator core and a coil; a housing that houses the rotor and the stator; and a first annular member that provides a seal between a first end face of the stator core in an axial direction of the stator core and an inner wall surface of the housing. The first annular member may include a plurality of first holes through which refrigerant is injected toward a first coil end of the coil protruding from the first end face of the stator core. The plurality of first holes may include a first large hole and a first small hole, and the first small hole may have an opening area smaller than an opening area of the first large hole.

20 Claims, 7 Drawing Sheets

(56) References Cited

U.S. PATENT DOCUMENTS

2013/0002067 A1* 1/2013 Bradfield ................. H02K 3/38
310/59
2015/0015095 A1* 1/2015 Kurono ................... H02K 3/50
310/54

FOREIGN PATENT DOCUMENTS

JP         2010-57261 A    3/2010
JP         2022-108361 A   7/2022

OTHER PUBLICATIONS

18501162_2025-08-17_CN_112615445_A_H.pdf (Year: 2025).*
CN_111969791_A_-_Translation.pdf (Year: 2025).*

* cited by examiner

21

50c1

1

MOTOR

REFERENCE TO RELATED APPLICATION

This application claims priority from Japanese Patent Application No. 2022-180238 filed on Nov. 10, 2022. The entire content of the priority application is incorporated herein by reference.

BACKGROUND ART

The technology disclosed herein relates to motors.

In a motor described in U.S. patent Ser. No. 11/125,315, a stator is housed in a housing. A plurality of injection holes is formed in an annular member that provides a seal between an axial end face of a stator core and an inner surface of the housing. Refrigerant is injected toward a coil end through each of the injection holes.

DESCRIPTION

Refrigerant may be injected through injection holes at different velocities depending on positions of the injection holes in a vertical direction, pressure gradient of the refrigerant, etc. This means that at some injection holes, the injection velocities may not be sufficient enough to cool a coil end.

A motor disclosed herein may comprise a rotor; a stator comprising a stator core and a coil; a housing that houses the rotor and the stator; and a first annular member that provides a seal between a first end face of the stator core in an axial direction of the stator core and an inner wall surface of the housing. The first annular member may comprise a plurality of first holes through which refrigerant is injected toward a first coil end of the coil protruding from the first end face of the stator core. The plurality of first holes may include a first large hole and a first small hole. The first small hole has an opening area smaller than an opening area of the first large hole.

The refrigerant may comprise various types of refrigerants. For example, the refrigerant may be cooling oil. Alternatively, the refrigerant may be a liquid such as water or a gaseous fluid. According to the configuration above, the opening area of the first small hole is smaller than the opening area of the first large hole. This allows an injection velocity of the refrigerant injected through the first small hole to be higher than an injection velocity of the refrigerant injected through the first large hole. Thus, the injection velocity can be appropriately adjusted to ensure that the injection velocity is sufficient enough to cool the coil end regardless of which first hole the refrigerant is injected through.

Figure 1:
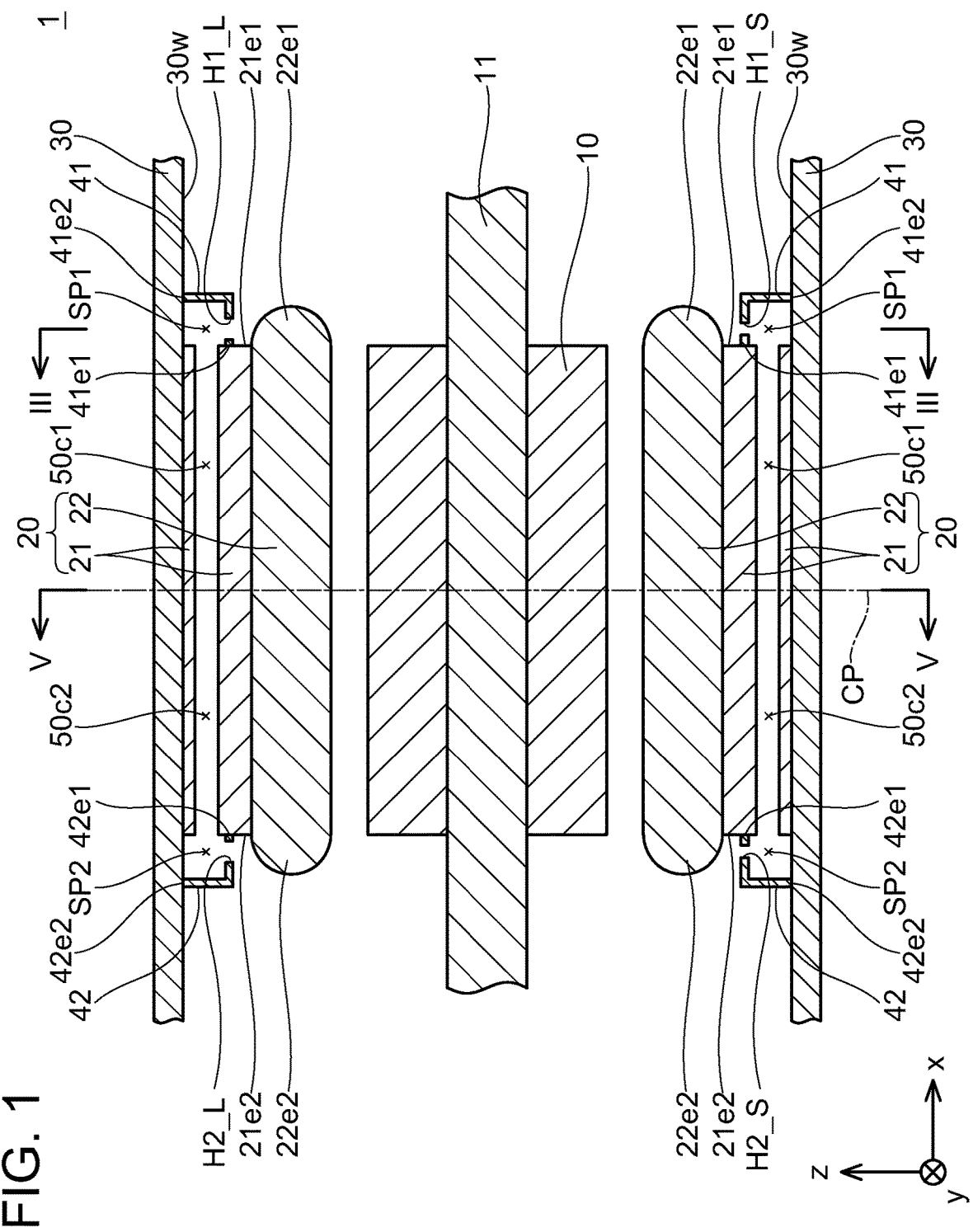
FIG. 1 is a schematic cross-sectional view of a motor 1.

The first small hole may be located below the first large hole in a vertical direction.

2

The refrigerant injected through a vertically lower hole has a larger velocity component in a direction opposite to the gravity direction, as compared to the refrigerant injected through a vertically upper hole. Therefore, a sufficient cooling effect for the coil end may not be obtained from the vertically lower hole. The configuration above allows the injection velocity at the first small hole, which is located below the first large hole in the vertical direction, to be higher than the injection velocity at the first large hole, which is located above the first small hole in the vertical direction. Therefore, a sufficient cooling effect can be obtained even at the first small hole, which is located vertically lower.

The first large hole may be an uppermost hole of the plurality of first holes, and the first small hole may be a lowermost hole of the plurality of first holes.

The refrigerant injected through the lowermost hole has the largest injection velocity component in the direction opposite to the gravity direction. According to the configuration above, the first small hole is the lowermost hole. This allows the refrigerant injection velocity to be increased at the lowermost hole, ensuring a sufficient cooling effect.

The opening area of the first small hole may be 90% or less of the opening area of the first large hole.

This configuration allows the refrigerant injection velocity at the first small hole to be increased appropriately as compared to the refrigerant injection velocity at the first large hole.

The plurality of first holes may further include at least one first medium hole. The at least one first medium hole has an opening area that is smaller than the opening area of the first large hole and larger than the opening area of the first small hole. The at least one first medium hole may be located below the first large hole in a vertical direction and is located above the first small hole in the vertical direction.

This configuration allows the refrigerant injection velocity at the at least one medium hole to be increased as compared to the refrigerant injection velocity at the first large hole and also allows the refrigerant injection velocity at the at least one medium hole to be decreased as compared to the refrigerant injection velocity at the first small hole. Thus, a cooling effect at the at least one medium hole, which is located between the first large hole and the first small hole, can be appropriately adjusted.

The at least one first medium hole may comprise a plurality of first medium holes. From an uppermost medium hole of the plurality of the first medium holes in the vertical direction toward a lowermost medium hole of the plurality of first medium holes in the vertical direction, opening areas of the plurality of first medium holes may gradually decrease.

The refrigerant has larger injection velocity components in the direction opposite to the gravity direction as it is injected through lower first medium holes. The configuration above allows the refrigerant injection velocity to be higher at lower first medium holes. Thus, the influence of the injection velocity components in the direction opposite to the gravity direction can be appropriately suppressed at each of the plurality of first medium holes.

The housing may comprise a supply port through which the refrigerant is supplied from outside. A flow path may be defined between an outer circumferential surface of the stator core and the inner wall surface of the housing, and the flow path may allow the refrigerant supplied through the supply port to flow toward the first annular member. The plurality of first medium holes may include two first medium holes located at the same height in the vertical direction. An opening area of one first medium hole of the two first medium holes may be smaller than an opening area of the other first medium hole of the two first medium holes. A flow passage of the refrigerant from the supply port to the one first medium hole may be shorter than a flow passage of the refrigerant from the supply port to the other first medium hole.

When the motor is started, the refrigerant supplied though the supply port flows out from the one first medium hole first and then flows out from the other first medium hole later. Once the flow path is completely filled with the refrigerant after a predetermined time from the motor start-up, the motor shifts to its normal operation state. According to the configuration above, the opening area of the one first medium hole is smaller than the opening area of the other first medium hole. This reduces an amount of the refrigerant flowing out first from the one first medium hole. Since the total amount of the refrigerant flowing out before the flow path is completely filled with the refrigerant is reduced, the motor can promptly shift to the normal operation state.

The housing may comprise a supply port through which the refrigerant is supplied from outside. A flow path may be defined between an outer circumferential surface of the stator core and the inner wall surface of the housing, and the flow path may allow the refrigerant supplied through the supply port to flow toward the first annular member. A flow passage of the refrigerant from the supply port to the first small hole may be shorter than a flow passage of the refrigerant from the supply port to the first large hole.

When the motor is started, the refrigerant starts to be supplied into the flow path through the supply port. The supplied refrigerant reaches the first annular member. An amount of the refrigerant within the flow path increases, while part of the refrigerant is flowing out from the first holes. Once the flow path is completely filled with the refrigerant after a predetermined time from the start of the motor, the motor shifts to its normal operation state and refrigerant is injected through the plurality of first holes. According to the configuration above, when the motor is started, the refrigerant supplied through the supply port reaches the first small hole first and then reaches the first large hole later. This configuration reduces the total amount of the refrigerant flowing out before the flow path is completely filled with the refrigerant, as compared to a configuration in which the refrigerant reaches the first large hole first. Thus, the configuration above allows the motor to promptly shift to the normal operation state.

The opening area of the first small hole may be 90% or less of the opening area of the first large hole.

This configuration can appropriately reduce an amount of the refrigerant flowing out from the first small hole as compared to an amount of the refrigerant flowing out from the first large hole, when the motor is started.

The plurality of first holes may further include at least one first medium hole. The at least one first medium hole has an opening area that is smaller than the opening area of the first large hole and larger than the opening area of the first small hole. A flow passage of the refrigerant from the supply port to the at least one first medium hole may be shorter than a flow passage of the refrigerant from the supply port to the first large hole and be longer than a flow passage of the refrigerant from the supply port to the first small hole.

This configuration can appropriately adjust an amount of the refrigerant flowing out from the at least one first medium hole when the motor is started.

The at least one first medium hole may comprise a plurality of first medium holes. The flow passage may comprise a plurality of flow passages, and each of the plurality of flow passages may be associated with corresponding one of the plurality of first medium holes. The first medium holes with shorter flow passages may have smaller opening areas.

This configuration can appropriately reduce an amount of the refrigerant flowing out from the first medium holes when the motor is started.

The stator core may further comprise a plurality of channels arranged to surround an outer circumferential surface of the stator core. The plurality of channels may extend in the axial direction.

This configuration can appropriately cool the stator core by flowing the refrigerant through the plurality of channels of the stator core.

The motor may further comprise a second annular member that provides a seal between a second end face of the stator core and the inner wall surface of the housing. The second end face is opposite to the first end face of the stator core in the axial direction. The second annular member may comprise a plurality of second holes through which the refrigerant is injected toward a second coil end of the coil protruding from the second end face of the stator core. The plurality of second holes may include a second large hole and a second small hole. The second small hole may have an opening area smaller than an opening area of the second large hole.

This configuration can appropriately cool both of the first coil end and the second coil end.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the disclosure. Furthermore, each of the additional features and teachings disclosed below may be utilized separately or in conjunction with other features and teachings to provide improved motors.

Moreover, combinations of features and steps disclosed in the following detailed description may not be necessary to practice the disclosure in the broadest sense, and are instead taught merely to particularly describe representative examples of the disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EMBODIMENTS

First Embodiment

Configuration of Motor 1

Figure 2:
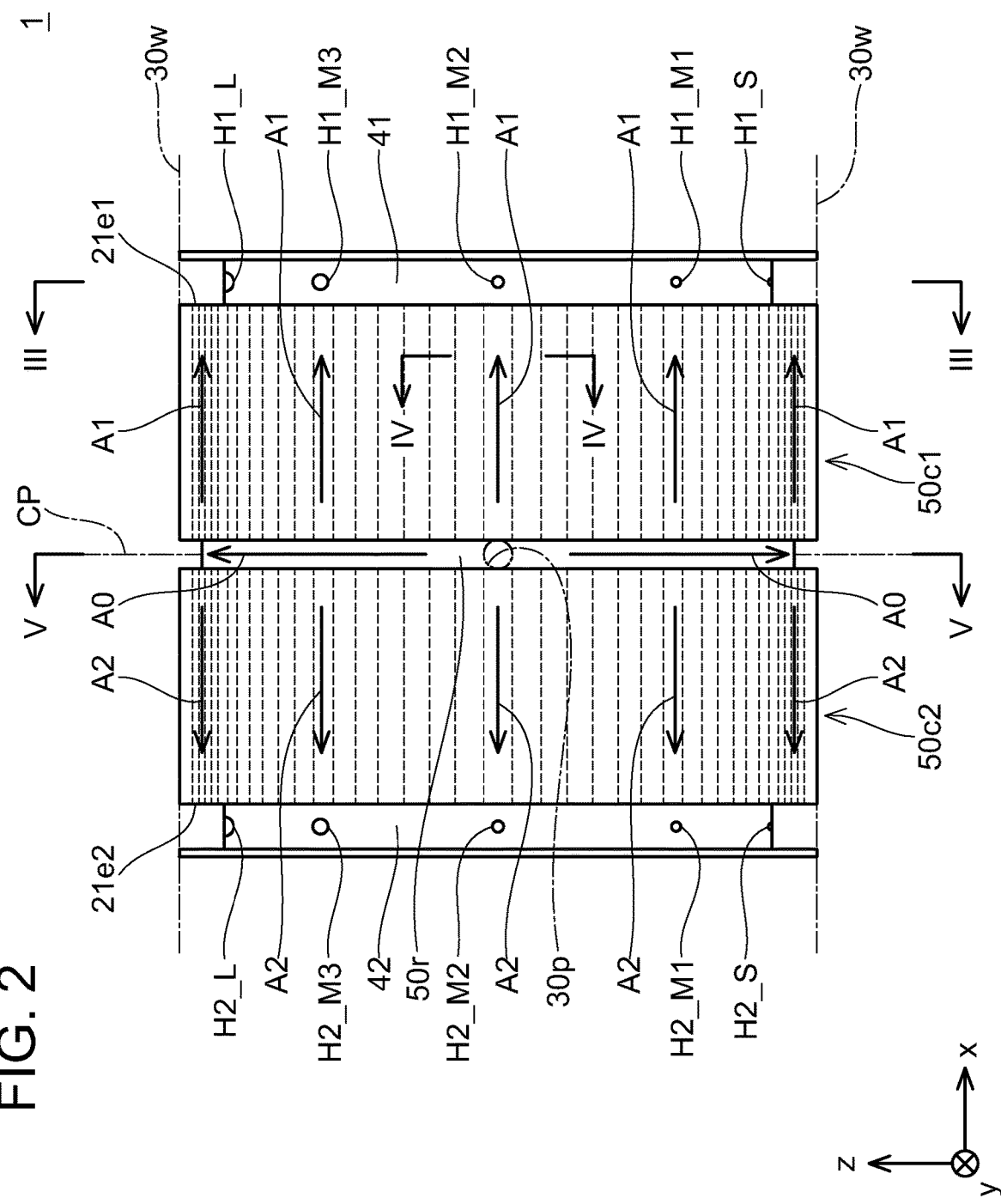
FIG. 2 is a side view of a stator 20, etc.

FIG. 1 shows a schematic cross-sectional view of a motor 1 according to an embodiment. FIG. 2 shows a side view of a stator 20, a first annular member 41, and a second annular member 42. In FIG. 2, depictions of a housing 30, a rotor 10, and a rotation shaft 11 are omitted for the sake of clarity, and an inner wall surface 30w and a supply port 30p of the housing 30 are represented by imaginary lines. In FIGS. 1 and 2, z-direction is a vertical direction, and x-direction and y-direction are horizontal directions. The x-direction is a direction in which the rotation shaft 11 extends. These directions also apply to the other drawings.

The motor 1 is mounted on an electric-powered vehicle. The electric-powered vehicle comprises a hybrid vehicle and an electric vehicle. In the electric-powered vehicle, the motor 1 may be used as a traction motor that generates power for the vehicle to travel, or as a generator that generates electric power from regenerative braking power and/or excess power of an engine. In the electric-powered vehicle, the motor 1 is mounted such that −z-direction is coincident with the gravity direction.

As shown in FIG. 1, the motor 1 comprises a center plane CP perpendicular to the rotation shaft 11. The center plane CP passes the center of a stator core 21 in its axial direction. The structure of the motor 1 is symmetric with respect to the center plane CP. Thus, hereinafter, the structure on +x-direction side relative to the center plane CP is mainly described.

The motor 1 mainly comprises the rotor 10, the stator 20, the housing 30, the first annular member 41, and the second annular member 42. The rotor 10 comprises the rotation shaft 11. The rotation shaft 11 is supported by the housing 30 via a bearing (not shown) and is rotatable. The rotor 10 is fixed to the rotation shaft 11.

The stator 20 comprises the stator core 21 and a coil 22. The stator core 21 is a substantially annular member formed, for example, of a stack of steel plates. The stator core 21 includes a first end face 21e1 at its one end in the axial direction (x-direction) and a second end face 21e2 at its other end in the axial direction. A wire that constitutes the coil 22 is wound around the stator core 21. A first coil end 22e1 of the coil 22 protrudes in the axial direction from the first end face 21e1. A second coil end 22e2 of the coil 22 protrudes in the axial direction from the second end face 21e2.

The housing 30 is a member that houses the rotor 10 and the stator 20. The housing 30 surrounds the stator 20. A supply hole 30p, which will be described later, is defined in a side surface of the housing 30. A cooling oil reservoir (not shown) is disposed at a bottom portion of the housing 30. Known prior art can be applied for basic configuration of the housing 30, and thus its detailed description is omitted here.

The first annular member 41 has a ring shape about the rotation shaft 11. The first annular member 41 is constituted of resin. As shown in FIG. 1, a first end portion 41e1 of the first annular member 41 is connected to the first end face 21e1 of the stator core 21. A second end portion 41e2 of the first annular member 41 is connected to an inner wall surface 30w of the housing 30. In this way, the first annular member 41 provides a seal between the first end face 21e1 and the inner wall surface 30w. A variety of features that enhance the sealability (e.g., seal groove) may be applied to the connection between the first end portion 41e1 and the first end face 21e1 and between the second end portion 41e2 and the inner wall surface 30w. A space SP1 is defined between the first annular member 41 and the inner wall surface 30w. The space SP1 has a ring shape about the rotation shaft 11. The first annular member 41 surrounds the first coil end 22e1. In other words, the first annular member 41 faces the first coil end 22e1.

Figure 3:
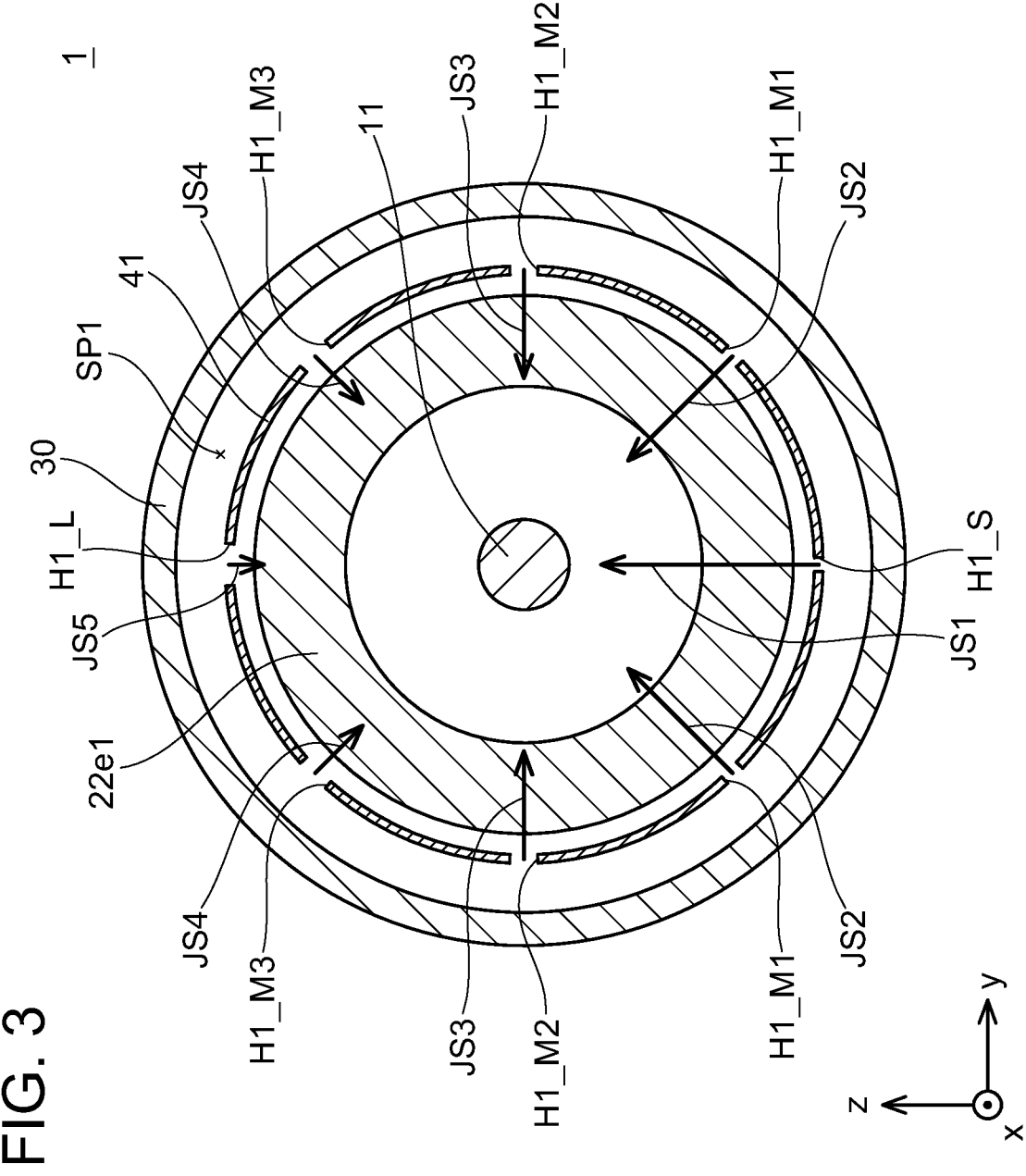
FIG. 3 is a schematic cross-sectional view along a line in FIG. 1.

The first annular member 41 comprises a plurality of first holes H1. Cooling oil is injected toward the first coil end 22e1 through the first holes H1. Referring to FIG. 3, the plurality of first holes H1 is described. FIG. 3 shows a schematic cross-sectional view along a line in FIG. 1. FIG. 3 shows a cross-sectional view passing the centers of the first holes H1. The plurality of first holes H1 penetrates the first annular member 41 in its thickness direction. As shown in FIG. 3, the first holes H1 are equally spaced apart from each other on a circumference. In the present embodiment, there are eight first holes H1.

The plurality of first holes H1 includes a first large hole H1_L, first medium holes H1_M1 to H1_M3 (which may be collectively referred to as "first medium holes H1_M"), and a first small hole H1_S. The first small hole H1_S is located below the first large hole H1_L in the vertical direction (z-direction). In the present embodiment, the first large hole H1_L is the uppermost hole among the first holes H1. The first small hole H1_S is the lowermost hole among the first holes H1. The first medium holes H1_M1 to H1_M3 include pairs of holes, and the holes in each pair are located at the same height in the vertical direction. In the vertical direction, the first medium holes H1_M1 to H1_M3 are located below the first large hole H1_L and are located above the first small hole H1_S. In the vertical direction, a height at which the first medium holes H1_M3 are located is greater than a height at which the first medium holes H1_M2 are located, and the height at which the first medium holes H1_M2 are located is greater than a height at which the first medium holes H1_M1 are located.

Openings of the first holes H1 are circular. Diameters of the openings differ among the first holes H1, and thus opening areas differ among them. The opening area of the first small hole H1_S is smaller than the opening area of the first large hole H1_L and the opening areas of the first medium holes H1_M. The opening areas of the first medium holes H1_M1 to H1_M3 are smaller than the opening area of the first large hole H1_L and larger than the opening area of the first small hole H1_S. The opening areas of the first medium holes H1_M1 to H1_M3 gradually decrease from the uppermost medium holes toward the lowermost medium holes in the vertical direction. In other words, the opening areas gradually increase from the first medium holes H1_M1 toward the first medium holes H1_M3. In FIG. 3, for the sake of clarity, the diameters of the first holes H1 are depicted larger than what they actually are, and the diameter differences between the holes are emphasized.

Figure 4:
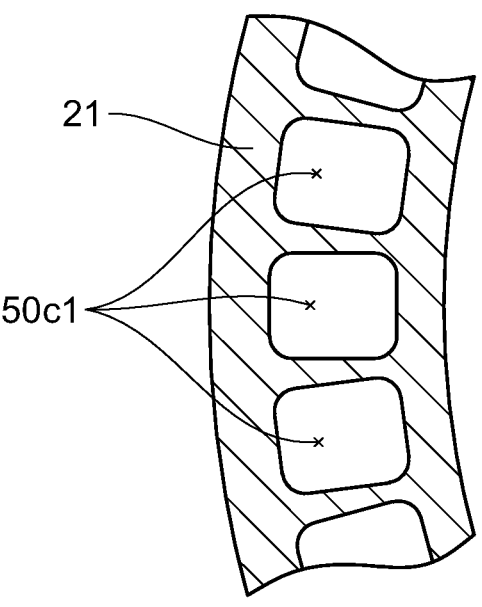
FIG. 4 is a partially enlarged view of a cross section along a line IV-IV in FIG. 2.
Figure 4:
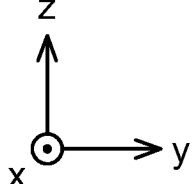
Figure 5:
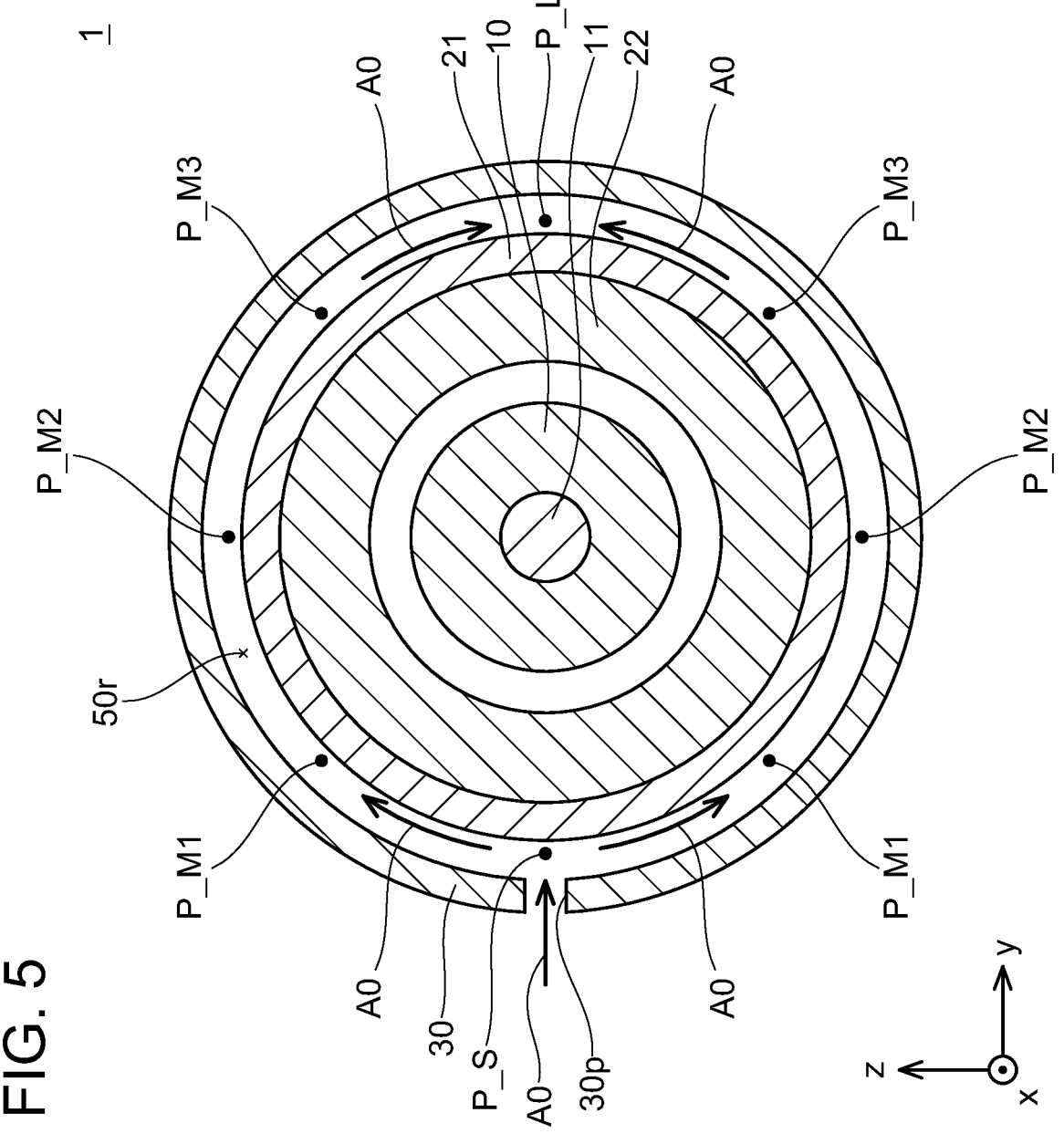
FIG. 5 is a schematic cross-sectional view along a line V-V lying on a center plane CP in FIG. 1.

Referring to FIGS. 1, 2, 4, and 5, the stator core 21 is described. FIG. 4 shows a partially enlarged view of a cross section along a line IV-IV in FIG. 2. FIG. 5 shows a schematic cross-sectional view along a line V-V lying on the center plane CP in FIG. 1. The stator core 21 is a cylindrical member. As shown in FIG. 2, the stator core 21 comprises an annular channel 50r, first channels 50c1, and second channels 50c2.

As shown in FIG. 5, the annular channel 50r is a groove defined in the stator core 21 to extend over the entire circumference thereof. The annular channel 50r is open upward. This opening is covered by the inner wall surface 30w, which defines a flow path. The annular channel 50r is in communication with the supply port 30p of the housing 30.

As shown in FIGS. 2 and 4, the first channels 50c1 are tunnel-shaped flow paths defined in an outer circumferential surface of the stator core 21. In FIG. 2, the plurality of first channels 50c1 and the plurality of second channels 50c2 are represented by broken lines. The plurality of first channels 50c1 extends from the annular channel 50r up to the first end face 21e1, which is oriented in +x-direction. The first channels 50c1 extend parallel to each other and are equally spaced apart from each other in the circumferential direction. The plurality of second channels 50c2 has the same configuration as that of the plurality of first channels 50c1. The plurality of second channels 50c2 extends from the annular channel 50r up to the second end face 21e2, which is oriented in −x-direction.

The structure on +x-direction side relative to the center plane CP has been mainly described above. The structure on −x-direction side relative to the center plane CP is similar to that on +x-direction side. That is, there is a second annular member 42 that provides a seal between the second end face 21e2 of the stator core 21 and the inner wall surface 30w of the housing 30. A space SP2 is defined between the second annular member 42 and the inner wall surface 30w. The second annular member 42 comprises a plurality of second holes H2. The cooling oil is injected toward the second coil end 22e2 through the plurality of second holes H2. The plurality of second holes H2 includes a second large hole H2_L, second medium holes H2_M1 to H2_M3, and a second small hole H2_S. The opening area of the second small hole H2_S is smaller than the opening areas of the second medium holes H2_M1 to H2_M3. The opening areas of the second medium holes H2_M1 to H2_M3 are smaller than the opening area of the second large hole H2_L. Further description on the structure on −x-direction side relative to the center plane CP is omitted herein.

Operation

How the motor 1 operates from its start-up until the shift to the normal operation state is described. When the motor 1 is started, the cooling oil in the cooling oil reservoir flows through a pump and a supply pipe, which are not shown, and then flows into the supply port 30p of the housing 30. The cooling oil supplied through the supply port 30p flows into the annular channel 50r. This cooling oil flows within the annular channel 50r in the circumferential direction (see arrows A0 in FIGS. 2 and 5). Then, the cooling oil flows into each of the plurality of first channels 50c1 and flows in +x-direction (see arrows A1 in FIG. 2). The cooling oil also flows into each of the plurality of second channels 50c2 and flows in −x-direction (see arrows A2 in FIG. 2).

The cooling oil flowing in the first channels 50c1 reaches the first annular member 41. An amount of the cooling oil in the space SP1 gradually increases, while part of the cooling oil is flowing out from the first holes H1. Thus, the level of the cooling oil in the space SP1 rises over time. Once the space SP1 is completely filled with the cooling oil after a predetermined time from the start of the motor 1, the motor 1 shifts to the normal operation state.

Referring to FIG. 3, how the cooling oil is injected in the normal operation state is described. In the normal operation state, the cooling oil is injected toward the first coil end 22e1 through each of the first large hole H1_L, the first medium holes H1_M, and the first small hole H1_S. In FIG. 3, injection velocities of the cooling oil are indicated by vectors of injection velocities JS1 to JS5. Longer vectors indicate higher velocities.

The opening area of the first small hole H1_S is 90% or less of the opening area of the first large hole H1_L. This allows the injection velocity JS1 at the first small hole H1_S, which is the lowermost hole among the first holes H1, to be significantly higher than the injection velocity JS5 at the first large hole H1_L. Further, since the opening areas of the first medium holes H1_M gradually decrease from the first medium holes H1_M3, which are the uppermost medium holes in the vertical direction (z-direction), toward the first medium holes H1_M1, which are the lowermost medium holes in the vertical direction (z-direction), the injection velocity J52 is the highest and the injection velocity J54 is the lowest. That is, the injection velocity gradually decreases from the injection velocity JS1 toward the injection velocity JS5.

Effects

The cooling oil injected through the first small hole H1_S, which is located below the first large hole H1_L in the vertical direction, has a larger injection velocity component in the opposite direction to the gravity direction (z-direction), as compared to the cooling oil injected through the first large hole H1_L, which is located above the first small hole H1_S in the vertical direction. Therefore, a cooling effect for the first coil end 22e1 may not be sufficiently obtained at the first small hole H1_S, which is located lower. As a measure against this, it can be contemplated to apply an increased pressure to the cooling oil in order to increase the injection velocity of the cooling oil. In this instance, however, sealing quality has to be enhanced in all flow paths of the cooling oil and a pumping loss is increased. In view of this, in the technology according to the present embodiment, the opening area of the first small hole H1_S is smaller than the opening area of the first large hole H1_L, allowing the injection velocity JS1 at the first small hole H1_S to be higher than the injection velocity JS5 at the first large hole H1_L (see FIG. 3). Thus, without having to apply an increased pressure to the cooling oil, a sufficient cooling effect can be ensured at the first small hole H1_S.

Although the injection velocity JS5 is lower at the first large hole H1_L, the opening area of the first large hole H1_L is larger. Thus, an amount of the cooling oil injected through the first large hole H1_L is substantially the same as an amount of the cooling oil injected through the first small hole H1_S. The cooling effect can thus be equalized among the first holes H1. That is, overall cooling balance can be improved.

Among the first medium holes H1_M1 to H1_M3, the cooling oil injected through lower first medium holes in the vertical direction has a larger injection velocity component in the opposite direction to the gravity direction, and thus the cooling effect is more difficult to obtain at lower first medium holes. In the technology according to the present embodiment, the opening areas of the first medium holes H1_M1 to H1_M3 decrease from the first medium holes H1_M3, which are the uppermost medium holes in the vertical direction, toward the first medium holes H1_M1, which are the lowermost medium holes in the vertical direction. This allows the injection velocity to be higher at lower first medium holes in the vertical direction. Therefore, the cooling effect can be appropriately obtained at each of the first medium holes H1_M1 to H1_M3.

When the motor 1 is started, the level of the cooling oil in the space SP1 rises, while part of the cooling oil is flowing out from the first holes H1. In the technology according to the present embodiment, first holes H1 located lower in the vertical direction have smaller opening areas. Therefore, smaller amounts of the cooling oil flow out from first holes H1 located lower in the vertical direction when the motor 1 is started. This reduces the total amount of refrigerant flowing out before the space SP1 is completely filled with the refrigerant. The motor 1 thus can promptly shift to the normal operation state.

Second Embodiment

Configurations of First Holes H201 and Second Holes H202

Figure 6:
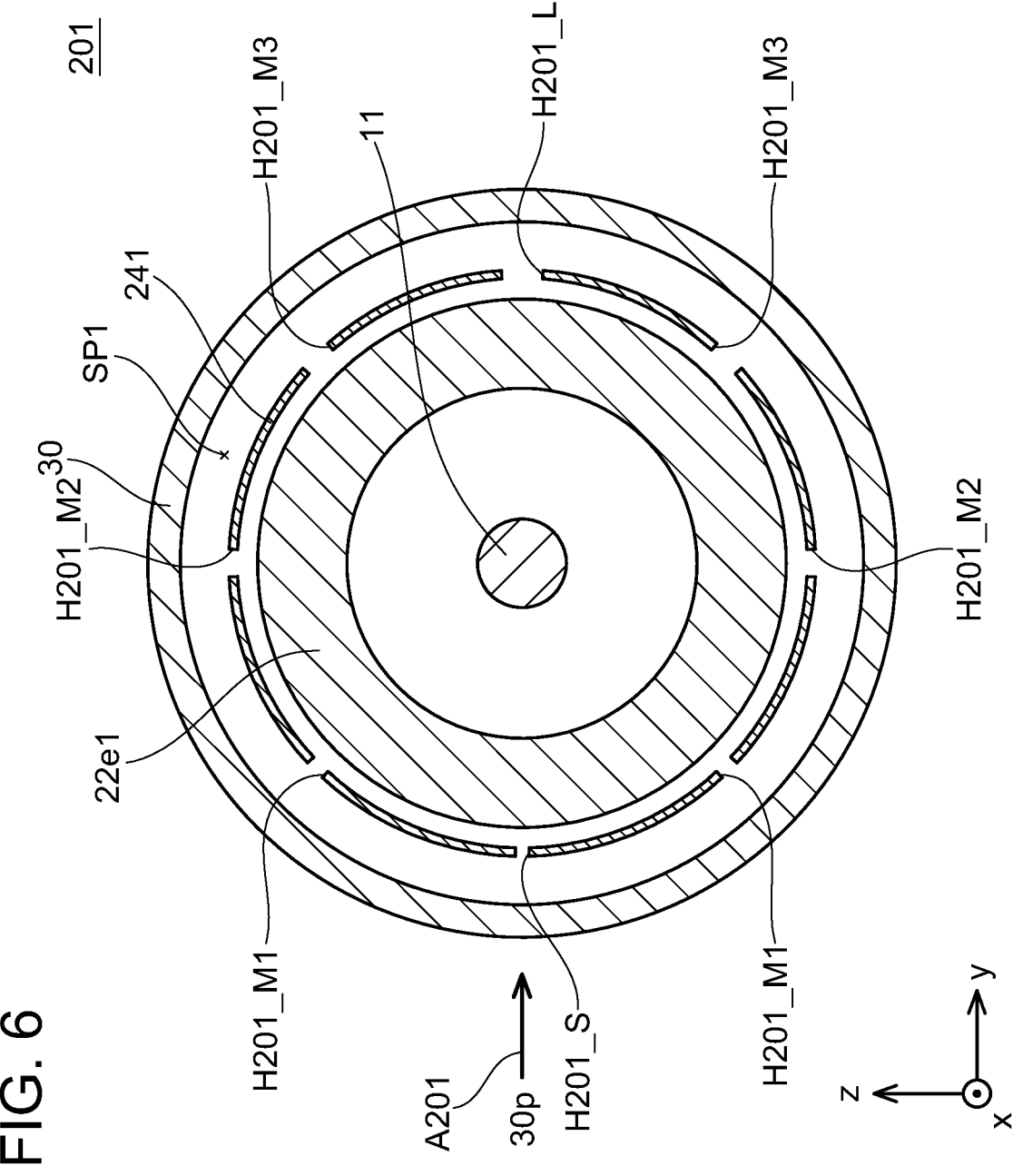
FIG. 6 is a schematic cross-sectional view of a motor 201.

A second embodiment is different than the first embodiment in a distribution of opening areas of a plurality of first holes H201 and a plurality of second holes H202. Configurations same as those described in connection with the first embodiment are labeled with the same reference signs, and description for them is omitted. Configurations unique to the second embodiment are labeled with reference signs having numbers of 200 or greater, for a distinction purpose. FIG. 6 shows a schematic cross-sectional view of a motor 201 according to the second embodiment. FIG. 6 shows a cross sectional view taken in the same manner as the cross-sectional view in FIG. 3 of the first embodiment. In FIG. 6, the position of the supply port 30$p$ of the housing 30 in the vertical direction is indicated with an arrow A201.

A first annular member 241 comprises a plurality of first holes H201. The plurality of first holes H201 includes a first large hole H201_L, first medium holes H201_M1 to H201_M3, and a first small hole H201_S. In the vertical direction, the first small hole H201_S and the first large hole H201_L are located at the same height as the supply port 30$p$. The first small hole H201_S is closer to the supply port 30$p$ than the first large hole H201_L is. A horizontal distance from the supply port 30$p$ to the first medium holes H201_M1 is shorter than a horizontal distance from the supply port 30$p$ to the first medium holes H201_M2, and the horizontal distance from the supply port 30$p$ to the first medium holes H201_M2 is shorter than a horizontal distance from the supply port 30$p$ to the first medium holes H201_M3.

The opening area of the first small hole H201_S is the smallest and the opening area of the first large hole H201_L is the largest among the opening areas of the first holes H201. The opening area of the first small hole H201_S is 90% or less of the opening area of the first large hole H201_L. The opening areas of the first medium holes H201_M1 to H201_M3 are smaller than the opening area of the first large hole H201_L and larger than the opening area of the first small hole H201_S. Among the first medium holes H201_M1 to H201_M3, first medium holes having larger horizontal distances from the supply port 30$p$ have larger opening areas. That is, the opening areas of the first medium holes increase from the first medium holes H201_M1 toward the first medium holes H201_M3.

A second annular member 242 according to the second embodiment comprises a plurality of second holes H202. Detailed description for the second holes $H_2O_2$ is omitted because the configuration of the plurality of second holes $H_2O_2$ is the same as that of the plurality of first holes H201 as described above.

Flow Passages

A flow passage of the cooling oil from the supply port 30$p$ to the first small hole H201_S is described. As shown in FIG. 5, the cooling oil that flowed through the supply port 30$p$ flows into a first channel 50$c$1 at a diverging point P S immediately near the supply port 30$p$. The cooling oil flows within the first channels 50$c$1 in the axial direction (in +x-direction) to reach the first small hole H201_S.

A flow passage of the cooling oil from the supply port 30$p$ to the first large hole H201_L is described. As indicated by arrows A0 in FIG. 5, the cooling oil that flowed through the supply port 30$p$ reaches, via the annular channel 50$r$, a diverging point P_L located opposite to the supply port 30$p$. The cooling oil flows into a first channel 50$c$1 at the diverging point P_L, flows in the first channels 50$c$1 in the axial direction (in +x-direction), and then reaches the first large hole H201_L.

Flow passages of the cooling oil from the supply port 30$p$ to the first medium holes H201_M1 to H201_M3 are described. As shown in FIG. 5, the cooling oil that flowed through the supply port 30$p$ reaches diverging points P_M1 to P_M3 via the annular channel 50$r$. The cooling oil flows into first channels 50$c$1 at the diverging points P_M1 to P_M3, flows in the first channels 50$c$1 in the axial direction (in +x-direction), and then reaches the first medium holes H201_M1 to H201_M3.

As described above, the flow passage from the supply port 30$p$ to the first small hole H201_S is the shortest, and the flow passage from the supply port 30$p$ to the first large hole H201_L is the longest. Further, the flow passage from the supply port 30$p$ to the first medium holes H201_M1 is shorter than the flow passage from the supply port 30$p$ to the first medium holes H201_M2, and the flow passage from the supply port 30$p$ to the first medium holes H201_M2 is shorter than the flow passage from the supply port 30$p$ to the first medium holes H201_M3.

Operation and Effects

When the motor 201 is started, the space SP1 starts to be filled with the cooling oil, while part of the cooling oil is flowing out from the plurality of first holes H201. Since the cooling oil reaches earlier first holes H201 having shorter flow passages from the supply port 30$p$, the outflow of the cooling oil starts occurring earlier there. That is, the outflow of the cooling oil occurs first at the first small hole H201_S and occurs last at the first large hole H201_L. Once the space SP1 is completely filled with the cooling oil after a predetermined time from the start of the motor 201, the motor 201 shifts to its normal operation state.

In the technology according to the present embodiment, first holes H201 having shorter flow passages from the supply port 30$p$ have smaller opening areas. Therefore, when the motor is started, first holes H201 the cooling oil reaches earlier have smaller outflow amounts of the cooling oil therefrom. This reduces the total amount of cooling oil flowing out before the space SP1 is completely filled with the cooling oil. Thus, the motor 201 can promptly shift to the normal operation state.

Third Embodiment

Configurations of First Holes H301 and Second Holes H302

Figure 7:
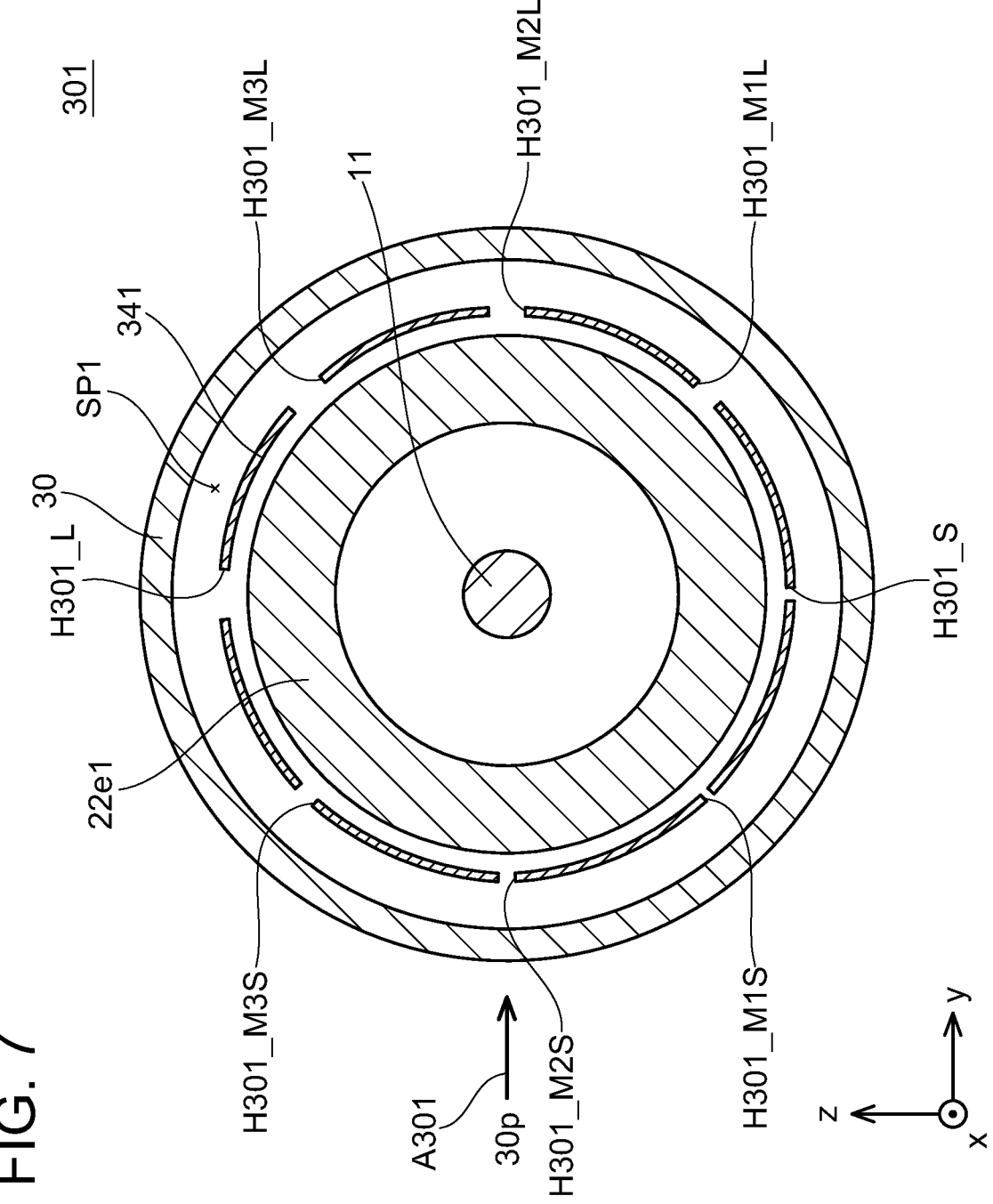
FIG. 7 is a schematic cross-sectional view of a motor 301.

Compared to the first and second embodiments, the third embodiment is different in a distribution of opening areas of a plurality of first holes H301 and a plurality of second holes H302. Configurations same as those described in connection with the first embodiment are labeled with the same reference signs, and description for them is omitted. Configurations unique to the third embodiment are labeled with reference signs having numbers of 300 or greater, for a distinction purpose. FIG. 7 shows a schematic cross-sectional view of a motor 301 according to the third embodiment. FIG. 7 shows a cross sectional view taken in the same manner as the cross-sectional view in FIG. 3 of the first embodiment. In FIG. 7, the position of the supply port 30$p$ of the housing 30 in the vertical direction is indicated with an arrow A301.

A first annular member 341 comprises a plurality of first holes H301. The plurality of first holes H301 includes a first large hole H301_L, first medium holes H301_MIL to H301_M3L, first medium holes H301_M1S to H301_M3S, and a first small hole H301_S. The first large hole H301_L is the uppermost hole among the first holes H301. The first small hole H301_S is the lowermost hole among the first holes H301. The first small hole H301_S has the smallest opening area, and the first large hole H301_L has the largest opening area.

The first medium hole H301_M1S and the first medium hole H301_M1L are a pair of first holes H301 located at the same height in the vertical direction. As described in connection with the second embodiment, a flow passage of the cooling oil from the supply port 30p to the first medium hole H301_M1S is shorter than a flow passage of the cooling oil from the supply port 30p to the first medium hole H301_M1L. Further, the opening area of the first medium hole H301_M1S is smaller than the opening area of the first medium hole H301_M1L.

Similarly, the first medium hole H301_M2S and the first medium hole H301_M2L are a pair of first holes H301 located at the same height in the vertical direction. A flow passage of the first medium hole H301_M2S is shorter than a flow passage of the first medium hole H301_M2L. Further, the opening area of the first medium hole H301_M2S is smaller than the opening area of the first medium hole H301_M2L.

Similarly, the first medium hole H301_M3S and the first medium hole H301_M3L are a pair of first holes H301 located at the same height in the vertical direction. A flow passage of the first medium hole H301_M3S is shorter than a flow passage of the first medium hole H301_M3L. Further, the opening area of the first medium hole H301_M3S is smaller than the opening area of the first medium hole H301_M3L.

The opening areas of the first medium holes H301_M1S to H301_M3S decreases from the uppermost first medium hole toward the lowermost first medium hole. Similarly, the opening areas of the first medium holes H301_MIL to H301_M3L decreases from the uppermost first medium hole toward the lowermost first medium hole.

A second annular member 342 according to the third embodiment comprises a plurality of second holes H302. Detailed description for the second holes H302 is omitted because the configuration of the plurality of second holes 302 is the same as that of the plurality of first holes H301 as described above.

Effects

In the technology according to the present embodiment, first holes H301 located lower in the vertical direction can provide higher injection velocities of the cooling oil. This ensures a sufficient cooling effect at first holes H301 located lower. Further, first holes H301 with shorter flow passages of the cooling oil from the supply port 30p have smaller opening areas. This allows for a reduction in the outflow amount of the cooling oil at the start of the motor 301. Thus, the motor 301 can promptly shift to the normal operation state.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

MODIFICATION

The shape of the openings of the first and second holes is not limited to circle but may be various other shapes. Further, the number and arrangement of the first and second holes are not limited to those described herein but may be different.

What is claimed is:

1. A motor comprising:
a rotor comprising a rotation shaft;
a stator comprising a stator core and a coil;
a housing that houses the rotor and the stator; and
a first annular member that provides a seal between a first end face of the stator core in an axial direction of the stator core and an inner wall surface of the housing,
wherein
the first annular member comprises a plurality of first holes through which refrigerant is injected toward a first coil end of the coil protruding from the first end face of the stator core,
the plurality of first holes includes a first large hole and a first small hole, the first small hole having an opening area smaller than an opening area of the first large hole, and
the first small hole is located below the rotation shaft in a vertical direction.

2. The motor according to claim 1, wherein the first small hole is located below the first large hole in the vertical direction.

3. The motor according to claim 1, wherein
the first large hole is an uppermost hole of the plurality of first holes, and
the first small hole is a lowermost hole of the plurality of first holes.

4. The motor according to claim 1, wherein the opening area of the first small hole is 90% or less of the opening area of the first large hole.

5. The motor according to claim 1, wherein
the plurality of first holes further includes at least one first medium hole, the at least one first medium hole having an opening area that is smaller than the opening area of the first large hole and larger than the opening area of the first small hole, and
the at least one first medium hole is located below the first large hole in a vertical direction and is located above the first small hole in the vertical direction.

6. The motor according to claim 5, wherein
the at least one first medium hole comprises a plurality of first medium holes, and
from an uppermost medium hole of the plurality of the first medium holes in the vertical direction toward a lowermost medium hole of the plurality of first medium holes in the vertical direction, opening areas of the plurality of first medium holes gradually decrease, and
at least one of the plurality of first medium holes is located below the rotation shaft in the vertical direction.

7. The motor according to claim 5, wherein
the housing comprises a supply port through which the refrigerant is supplied from outside,
a flow path is defined between an outer circumferential surface of the stator core and the inner wall surface of the housing, and the flow path allowing the refrigerant supplied through the supply port to flow toward the first annular member, the plurality of first medium holes includes two first medium holes located at the same height in the vertical direction, an opening area of one first medium hole of the two first medium holes is smaller than an opening area of the other first medium hole of the two first medium holes, and a flow passage of the refrigerant from the supply port to the one first medium hole is shorter than a flow passage of the refrigerant from the supply port to the other first medium hole.

8. The motor according to claim 1, wherein the housing comprises a supply port through which the refrigerant is supplied from outside, a flow path is defined between an outer circumferential surface of the stator core and the inner wall surface of the housing, and the flow path allowing the refrigerant supplied through the supply port to flow toward the first annular member, and a flow passage of the refrigerant from the supply port to the first small hole is shorter than a flow passage of the refrigerant from the supply port to the first large hole.

9. The motor according to claim 8, wherein the opening area of the first small hole is 90% or less of the opening area of the first large hole.

10. The motor according to claim 8, wherein the plurality of first holes further includes at least one first medium hole, the at least one first medium hole having an opening area that is smaller than the opening area of the first large hole and larger than the opening area of the first small hole, and a flow passage of the refrigerant from the supply port to the at least one first medium hole is shorter than a flow passage of the refrigerant from the supply port to the first large hole and is longer than a flow passage of the refrigerant from the supply port to the first small hole.

11. The motor according to claim 10, wherein the at least one first medium hole comprises a plurality of first medium holes, the flow passage comprises a plurality of flow passages, each of the plurality of flow passages is associated with one of the plurality of first medium holes, and the first medium holes with shorter flow passages have smaller opening areas.

12. The motor according to claim 1, wherein the stator core further comprises a plurality of channels arranged to surround an outer circumferential surface of the stator core, and the plurality of channels extends in the axial direction.

13. The motor according to claim 1, wherein the motor further comprises a second annular member that provides a seal between a second end face of the stator core and the inner wall surface of the housing, the second end face being opposite to the first end face of the stator core in the axial direction, the second annular member comprises a plurality of second holes through which the refrigerant is injected toward a second coil end of the coil protruding from the second end face of the stator core, and the plurality of second holes includes a second large hole and a second small hole, the second small hole having an opening area smaller than an opening area of the second large hole.

14. The motor according to claim 13, wherein the second small hole is located below the second large hole in a vertical direction.

15. The motor according to claim 13, wherein the second large hole is an uppermost hole of the plurality of second holes, and the second small hole is a lowermost hole of the plurality of second holes.

16. The motor according to claim 13, wherein the opening area of the second small hole is 90% or less of the opening area of the second large hole.

17. The motor according to claim 13, wherein the plurality of second holes further includes at least one second medium hole, the at least one second medium hole having an opening area that is smaller than the opening area of the second large hole and larger than the opening area of the second small hole, and the at least one second medium hole is located below the second large hole in a vertical direction and is located above the second small hole in the vertical direction.

18. The motor according to claim 17, wherein the at least one second medium hole comprises a plurality of second medium holes, and from an uppermost medium hole of the plurality of second medium holes in the vertical direction toward a lowermost medium hole of the plurality of second medium holes in the vertical direction, opening areas of the plurality of second medium holes gradually decrease.

19. The motor according to claim 13, wherein the housing comprises a supply port through which the refrigerant is supplied from outside, a flow path is defined between an outer circumferential surface of the stator core and the inner wall surface of the housing, and the flow path allowing the refrigerant supplied through the supply port to flow toward the second annular member, and a flow passage of the refrigerant from the supply port to the second small hole is shorter than a flow passage of the refrigerant from the supply port to the second large hole.

20. The motor according to claim 19, wherein the plurality of second holes further includes at least one second medium hole, the at least one second medium hole having an opening area that is smaller than the opening area of the second large hole and larger than the opening area of the second small hole, and a flow passage of the refrigerant from the supply port to the at least one second medium hole is shorter than the flow passage of the refrigerant from the supply port to the second large hole and is longer than the flow passage of the refrigerant from the supply port to the second small hole.

* * * * *